United States Patent
Burgett (10) Patent No.: US 10,692,228 B2
(45) Date of Patent: Jun. 23, 2020

(54) IDENTIFYING SPATIAL LOCATIONS OF IMAGES USING LOCATION DATA FROM MOBILE DEVICES

(71) Applicant: Mapbox, Inc., San Francisco, CA (US)

(72) Inventor: Damon Burgett, Berkeley, CA (US)

(73) Assignee: Mapbox, Inc., San Francisco, CA (US)

( * ) Notice: Subject to any disclaimer, the term of this patent is extended or adjusted under 35 U.S.C. 154(b) by 252 days.

(21) Appl. No.: 15/675,559

(22) Filed: Aug. 11, 2017

(65) Prior Publication Data
US 2019/0051003 A1 Feb. 14, 2019

(51) Int. Cl.
| | |
|---|---|
| *G06T 7/40* | (2017.01) |
| *G06T 7/12* | (2017.01) |
| *G06T 7/00* | (2017.01) |
| *G06T 5/00* | (2006.01) |
| *G06K 9/62* | (2006.01) |
| *G06K 9/00* | (2006.01) |
| *G06T 7/73* | (2017.01) |

(52) U.S. Cl.
CPC ............ *G06T 7/40* (2013.01); *G06K 9/00637* (2013.01); *G06K 9/6202* (2013.01); *G06T 5/002* (2013.01); *G06T 7/0002* (2013.01); *G06T 7/12* (2017.01); *G06T 7/73* (2017.01); *G06T 2207/10032* (2013.01); *G06T 2207/30184* (2013.01)

(58) Field of Classification Search
None
See application file for complete search history.

(56) References Cited

U.S. PATENT DOCUMENTS

| | | | | |
|---|---|---|---|---|
| 6,801,662 B1 * | 10/2004 | Owechko | ........... | G06K 9/00201 382/103 |
| 8,027,527 B2 * | 9/2011 | Shibuya | ............. | G01N 21/9501 382/141 |
| 8,315,477 B2 * | 11/2012 | Acree | .................... | G01C 11/00 348/61 |
| 10,223,816 B2 * | 3/2019 | Dorum | .................... | G06T 11/20 |
| 2007/0125951 A1 * | 6/2007 | Snider | .................. | G06K 9/3233 250/363.03 |
| 2009/0012745 A1 * | 1/2009 | Longman | .................. | G01T 7/00 702/179 |
| 2009/0024315 A1 * | 1/2009 | Scheibe | ............... | G01C 21/367 701/532 |
| 2018/0038695 A1 * | 2/2018 | Bitra | .................... | G08G 5/0069 |

* cited by examiner

*Primary Examiner* — Iman K Kholdebarin
(74) *Attorney, Agent, or Firm* — Fenwick & West LLP (57) ABSTRACT

A system determines spatial locations of pixels of an image. The system includes a processor configured to: receive location data from devices located within a hotspot; generate a density map for the hotspot including density pixels associated with spatial locations defined by the location data, each density pixel having a value indicating an amount of location data received from an associated spatial location; match the density pixels of the density map to at least a portion of the pixels of the image; and determine spatial locations of the at least a portion of the pixels of the image based on the spatial locations of the matching density pixels of the density map. In some embodiments, the image and density map are converted to edge maps, and a convolution is applied to the edge maps to match the density map to the pixels of the image.

22 Claims, 9 Drawing Sheets

Determine spatial locations of a first portion of pixels of an image based on spatial locations of matching first density pixels of a first density map of a first hotspot
905

Determine spatial locations of a second portion of the pixels of the image based on spatial locations of matching second density pixels of a second density map of a second hotspot
910

Determine spatial locations of other pixels of the according to the spatial locations of the first portion of the pixels of the image and the second spatial locations of the second portion of the pixels of the image
915

Generate candidate density maps for candidate hotspots from location data
1105

Generate offset images of an image, each of the offset images having an offset from the image
1110

For each offset image, match the pixels of the density map with at least a portion of the pixels of the image to determine an offset value
1115

For each offset image, determine an error value between the offset value and the offset of the offset image
1120

Determine a hotspot score for the candidate hotspot based on error values for the offset images
1125

Select a hotspot for process 200/300/900 based on the hotspot score of the candidate hotspot and hotspot scores of one or more other candidate hotspots
1130

FIG. 11

IDENTIFYING SPATIAL LOCATIONS OF IMAGES USING LOCATION DATA FROM MOBILE DEVICES

BACKGROUND

This disclosure generally relates to matching images, such as satellite images, to spatial locations.

When a satellite, aerial device, or the like captures an image of a geographical area, there is uncertainty regarding the precise spatial location captured in the image. For example, various types of image distortions can be caused by tilt of the satellite or variations in surface topography. These distortions, among other things, complicate the accurate registration of pixels of the image to precise spatial locations.

SUMMARY

Systems and methods for determining spatial locations of pixels of an image based on location data received from mobile devices are discussed herein. For example, a system may include one or more processors that receive location data from devices located within a hotspot, and generate a density map for the hotspot including density pixels associated with spatial locations defined by the location data. Each density pixel has a value indicating an amount of location data received from an associated spatial location. The one or more processors match the density pixels of the density map to at least a portion of the pixels of the image, and determine spatial locations of the at least a portion of the pixels of the image based on the spatial locations of the matching density pixels of the density map.

In some embodiments, the one or more processors match the density pixels of the density map to the at least a portion of the pixels of the image by generating a first edge map from the density map and generating a second edge map from the image. The first edge map including first edge pixels defining edges in the density pixels of the density map. The second edge map including second edge pixels defining edges in the pixels of the image. The one or more processors match the first edge pixels of the first edge map with at least a portion of the second pixels of the second edge map. In some embodiments, the one or more processors apply a convolution on the second edge map using the first edge map as a convolution kernel.

In some embodiments, the one or more processors select a hotspot for matching with an image from candidate hotspots. The one or more processors generate candidate density maps for candidate hotspots from second location data received from the devices, each second candidate density map including second density pixels, and generate offset images of a second image, each of the offset images having an offset from the second image. For each offset image, the one or more processors match second density pixels of a candidate density map with at least a portion of pixels of the offset image to determine an offset value, and determine an error value between the offset value and the offset of the offset image. The one or more processors determine a hotspot score for the candidate hotspot based on the error values for the offset images, and select the candidate hotspot as the hotspot based on the hotspot score for the candidate hotspot and one or more other hotspot scores for one or more other candidate hotspots.

Some embodiments include a method for determining spatial locations of pixels of an image. The method includes receiving location data from devices located within a hotspot, and generating a density map for the hotspot including density pixels associated with spatial locations defined by the location data. Each density pixel has a value indicating an amount of location data received from an associated spatial location. The method further includes matching the density pixels of the density map to at least a portion of the pixels of the image, and determining spatial locations of the at least a portion of the pixels of the image based on the spatial locations of the matching density pixels of the density map.

Some embodiments include non-transitory computer readable medium storing instructions that when executed by a processor configures the processor to: receive location data from devices located within a hotspot; generate a density map for the hotspot including density pixels associated with spatial locations defined by the location data, each density pixel having a value indicating an amount of location data received from an associated spatial location; match the density pixels of the density map to at least a portion of the pixels of the image; and determine spatial locations of the at least a portion of the pixels of the image based on the spatial locations of the matching density pixels of the density map.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
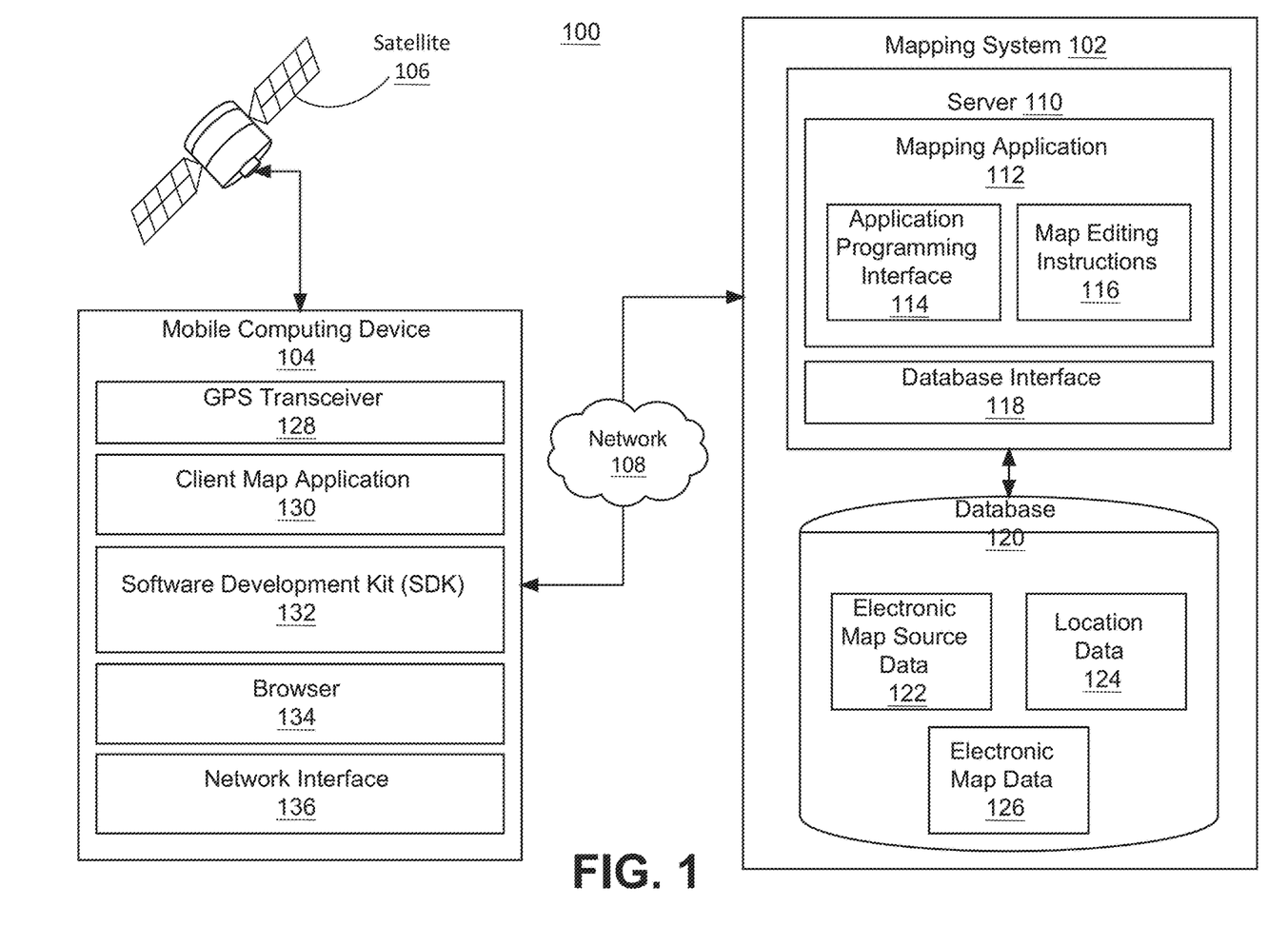
FIG. 1 is a block diagram of a system environment, in accordance with some embodiments.

FIG. 1 is a block diagram of a system environment 100, according to one embodiment. The system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The system 100 includes a mapping system 102, a mobile computing device 104 (or "device 104"), a satellite 106, and a network 108. The mapping system 102 includes a server 110 connected to a database 112. The mapping system 102 is connected to the mobile computing device 104 via the network 108.

The server 104 includes a mapping application 112, an application programming interface (API) 114, map editing instructions 116, and a database interface 118. The database 120 comprises electronic map source data 122, location data 124, and electronic map data 126.

Server 110 may be various computing devices, including but not limited to: servers, racks, work stations, personal computers, general purpose computers, laptops, Internet appliances, wireless devices, wired devices, multi-processor systems, mini-computers, and the like. Although FIG. 1 shows a single server 110, the mapping system 102 may include one or more multiple serves 110, such as a server cluster, and the server 110 may be located in one or more physical locations. The server 110 may also represent one or more virtual computing instances that execute using one or more computers in a datacenter such as a virtual server farm.

The server 110 is communicatively connected to database 120 and the mobile computing device 145 through any kind of computer network using any combination of wired and wireless communication, including, but not limited to: a Local Area Network (LAN), a Wide Area Network (WAN), one or more internetworks such as the public Internet, or a company network. The server 110 may host or execute mapping application 112, and may include other applications, software, and other executable instructions, such as database interface 118.

In one embodiment, database interface 118 is a programmatic interface such as JDBC or ODBC for communicating with database 120. Database interface 118 may communicate with any number of databases and any type of database, in any format. Database interface 118 may be a piece of customer software created by an entity associated with mapping application 112, or may be created by a third party entity in part or in whole.

The database 120 is a data storage subsystem including programs and data that is stored on any suitable storage device such as one or more hard disk drives, memories, or any other electronic digital data recording device configured to store data. Although database 120 is depicted as a single database in FIG. 1, the database 120 may span multiple devices located in one or more physical locations. For example, the database 120 may include one or nodes located at a data warehouse(s). Additionally, in one embodiment, database 120 may be located on the same device(s) as the server 110. Alternatively, database 120 may be located on a separate device(s) from server 110.

Database 120 may be in any format, such as a relational database, a noSQL database, or any other format. Database 120 is communicatively connected with the server 110 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 122, location data 124, and electronic map data 126. In some embodiments, these datasets may be stored as columnar data in a relational database or as flat files.

The electronic map source data 122 includes raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server 110. Electronic map source data 122 may be updated at any suitable interval, and may be stored for any amount of time. Once obtained or received, electronic map source data 122 is used to generate electronic map data 124.

The location data 124 includes data received from devices 104. The location data 124 indicates spatial locations, such as in (X, Y) coordinates, of the devices 104. The server 110 captures location data over time from multiple devices 104, such as while users of the devices 104 are traveling. The location data 124 is used to generate density maps for hotspots including density pixels associated with spatial locations defined by the location data. Each density pixel of a density map has a value defining an amount of location data received from an associated spatial location, such as within a predefined period of time. In some embodiments, the location data 124 includes location data associated with particular geographic regions that are effective for matching with pixels of images of the electronic map source data 122. A hotspot can include, for example, a geographical region with irregular non-grid road layout, such as curved roads and intersections. The location data 124 may include location data captured from the devices 104 as users carrying the devices 104 are traveling on the roads in hotspots.

The electronic map data 126 includes digital map data that is provided, either directly or indirectly, to client map applications, such as client map application 130, using an API. Electronic map data 126 may be generated based on the electronic map source data 122 and the location data 124. For example, the spatial locations of the images of the map source data 122 are determined based on comparisons with density maps of hotspots generated from the location data 124. Electronic map data 126 may be updated at any suitable interval, and may include additional information beyond those derived from the electronic map source data 122.

The server 110 executes the mapping application 110, which provides the API 114 that may be accessed, for example, by client map application 130 using software development kit (SDK) 132. Specifically, mapping application 110 comprises program instructions that are programmed or configured to perform a variety of backend functions needed for electronic mapping including, but not limited to: receiving map requests from the devices 104, sending electronic map data to the devices 104, receiving electronic map source data 122 from data providers, processing electronic map source data 122 and location data 124 to generate electronic map data 126, and any other aspects of embodiments described herein.

The map editing instructions 116 may include instructions for causing display of a graphical user interface of a map editing program at devices 104. The map editing program may be implemented as locally installed software, for example, or using a software as a service architecture in which a web browser 134 accesses the server 110 executing map editing instructions 116. The server 110 generates and sends instructions to the browser 134 to generate the graphical user interface.

The mobile computing device 104 includes a global positioning system (GPS) transceiver 128, the client map application 130, the SDK 132, the browser 134, and wireless network interface 136. The device 104 may be any mobile device, such as a hand-held computer, wearable computer, cellular or mobile phone, portable digital assistant (PDA), tablet computer, and the like. In some embodiments, the device 104 is an onboard GPS device of an automobile navigation system.

The GPS transceiver 128 communicates with the satellite 106 to receive location data indicating the location of the device 104. For example, the satellite 106 sends the GPS coordinates of the device 104 to the device 104. In addition or alternative to GPS coordinates, the location data may be generated based on local cellular, Wi-Fi, Bluetooth, and/or cell tower triangulation. Multiple techniques for gathering location data may be used to improve the accuracy spatial locations defined by the location data. The device 104 transmits the location data to the server 110 to facilitate determination of spatial of location of captured images.

The device 104 also includes network interface 136, which is used by the device 104 to communicate with other devices. In particular, network interface 136 is used to establish a connection to the server 110 via the network 108. Network interface 108 may use Ethernet, WiFi, WiMAX, Bluetooth, ZigBee, cellular standards, or others.

The device 104 may include other hardware components, such as one or more input devices, memory, processors, and the like, which are not depicted in FIG. 1. The device 104 also includes applications, software, and other executable instructions to facilitate various aspects of embodiments described herein. These applications, software, and other executable instructions may be installed by a user, owner, manufacturer, or other entity related to the device 104.

In some embodiments, the device 104 includes client map application 130 which is software that displays, uses, supports, or otherwise provides electronic mapping functionality as part of the application or software. Client map application 130 may be any type of application, such as a taxi service, a video game, a chat client, a food delivery application, etc. In an embodiment, client map application 133 obtains electronic mapping functions through SDK 132, which may implement functional calls, callbacks, methods, or other programmatic means for contacting the server computer to obtain digital map tiles, layer data, or other data that can form the basis of visually rendering a map as part of the application 130. In general, SDK 132 allows developers to implement electronic mapping without having to design all of the components from scratch. For example, SDK 132 may be downloaded from the Internet by developers, and subsequently incorporated into an application which is later used by individual users.

The browser 134 is a computer application that may request and execute instructions received from web servers to generate complex user interfaces that are presented to a user through one or more output devices, such as a display or speakers. In response to input from a user, such as a mouse click or touch indicating that the user selected an object defined in the instructions, such as a button or a text box, a browser may send a request based on the selected object to the web server. The request may be a request for data or include data to be processed by the web server. In an embodiment, browser 134 may receive instructions from server 110 to generate a user interface of a map editing program through which a user may create and modify map display properties or styles. Additionally or alternatively, the device 104 may include a map editing application or software that provides map editing functions as part of the application or software.

Identifying Spatial Locations of Images

Figure 2:
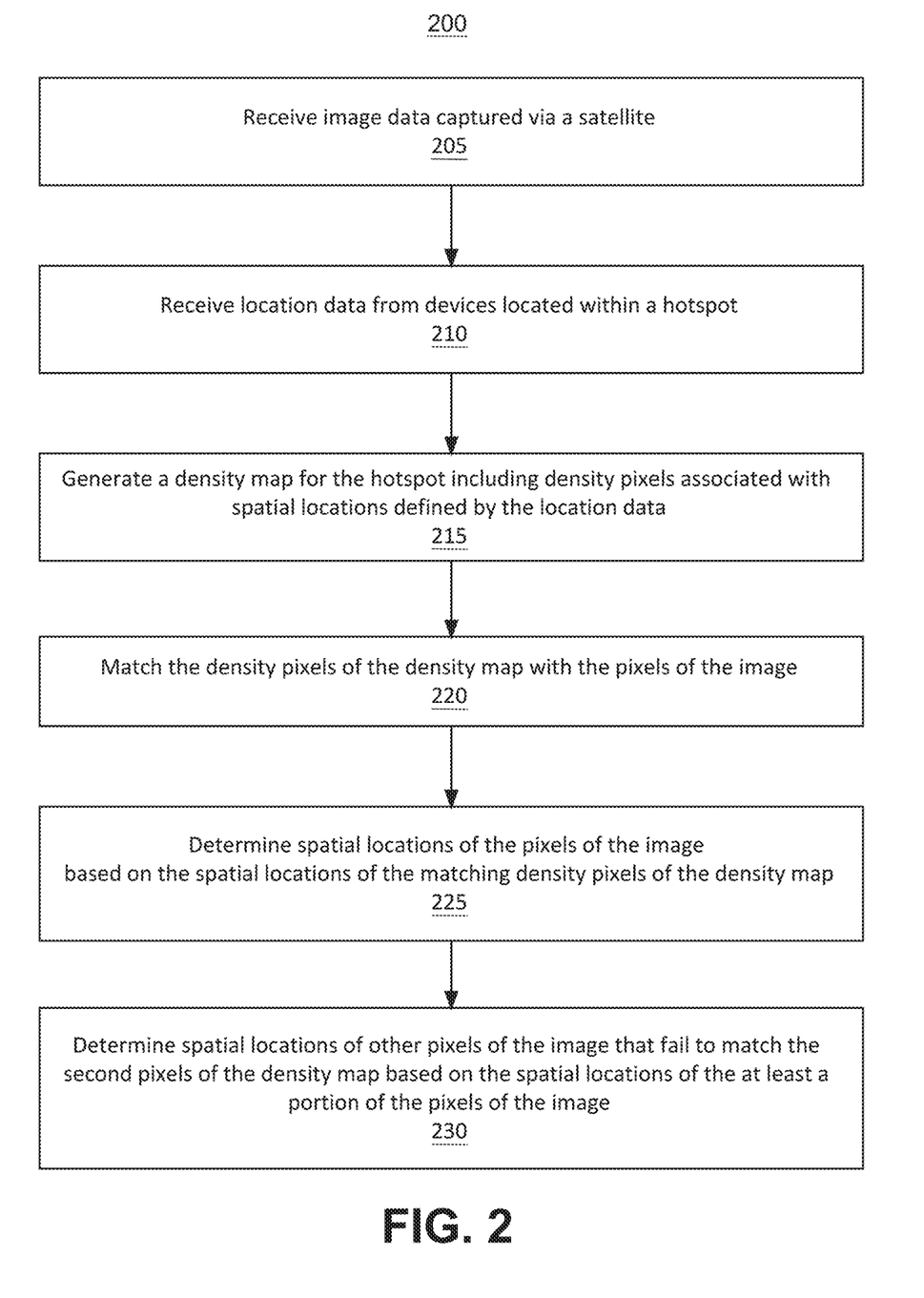
FIG. 2 is a flow chart of a process for determining spatial locations of pixels of an image, in accordance with some embodiments.

FIG. 2 is a flow chart of a process 200 for determining spatial locations of pixels of an image, in accordance with some embodiments. The process 200 provides for programmatic identification of the precise spatial location of the image based on comparisons with a density map of a hotspot generated from location data collected from mobile devices 104. The location data provides for efficient collection of known spatial locations of the density map. In some embodiments, the steps of the process 200 are performed by components of the system 100, such as by the server 110 of the mapping system 102 or the mobile device 104. For example, the server 110 generates the electronic map data 126 from the electronic map source data 122 and the location data 124 using the process 200. In other embodiments, a different computing device, such as a backend processor of the mapping system 102, performs the process 200. The steps may be performed in different orders, and the process 200 may include different, additional, or fewer steps.

The server 110 receives 205 image data captured via a satellite. The image may be an aerial image including pixels that depict a geographical region. In some embodiments, the image data is captured by a device other than a satellite, such a plane, an unmanned autonomous vehicle (UAV), etc. The server 110 may store the image data as the electronic map source data 122 in the database 120.

Figure 4:
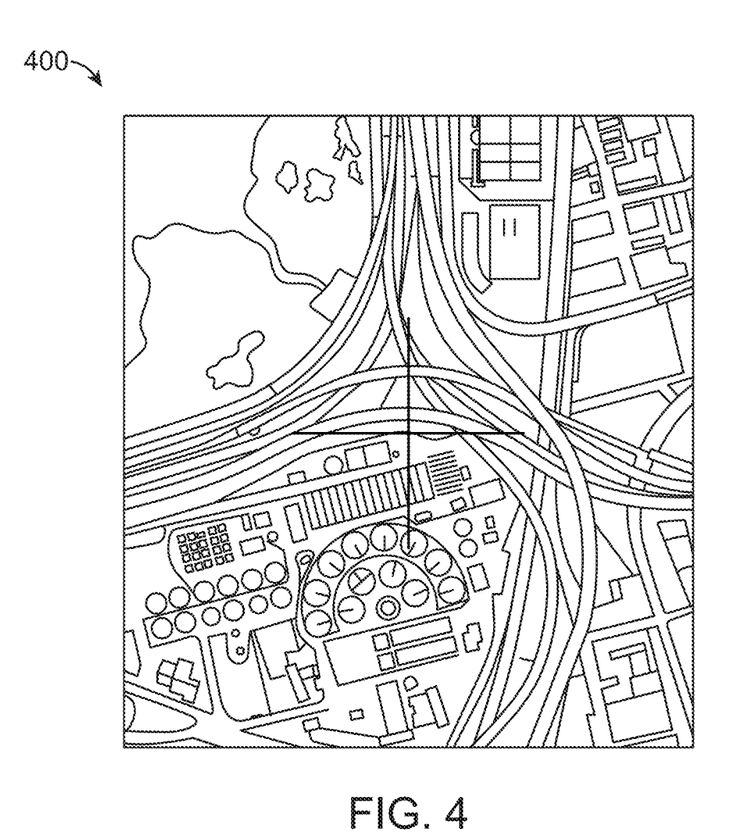
FIG. 4 is an example of an image, in accordance with some embodiments.

FIG. 4 is an example of an image 400, in accordance with some embodiments. The image 400 is an example of an aerial image captured via a satellite, via a plane, via an unmanned autonomous vehicle (UAV) (e.g., a drone), or some other image capture device. The spatial locations of the pixels of the image 400 can be determined with precision by matching with density pixels of a density map. The roads in the image 400 serve as distinctive features for the matching with roads defined by the density map.

Returning to FIG. 2, the server 110 receives 210 location data from mobile devices 104 located within a hotspot. A hotspot refers to a geographical region having known spatial locations, and used to identify the spatial locations of pixels in images. In some embodiments, spatial locations are defined by coordinates, such as GPS coordinates or some other type of coordinates. The server 110 receives the location data multiple mobile devices 104 over time via the network, and stores the received information as location data 124 in the database 120. In some embodiments, the server 110 compares coordinates of received location data with coordinates defined within the hotspot to generate a collection of the location data for the hotspot. The location data may be captured from the devices 104 as the devices 104 are traveling in the hotspot.

The server 110 generates 215 a density map for the hotspot including density pixels associated with spatial locations defined by the location data. Each spatial location of the hotspot can be represented by a density pixel of the density map. Each density pixel of the density map has a value indicating an amount of location data received from a spatial location associated with the density pixel. For example, the server 110 receives the location data from devices 104 over a period time. Each spatial location indicated by the location data is recorded and increases the value of the density pixel associated with the spatial location. Spatial locations with higher traffic as measured by the amount of location data received from devices 104 have higher values for the corresponding density pixels, while spatial locations with less traffic have lower values for their corresponding density pixels.

If the geographical region of the hotspot has roads, the road structure will be captured by the values of the density pixels of the density map. For example, more devices 104 can be expected to be traveling on roads than at other regions of the hotspot, and thus aggregating location data from multiple devices 104 results in the density map having larger values (e.g., higher density of received location data) at spatial locations corresponding with roads. Thus, the density map provides a representation of road layout within the geographical region of the hotspot, and further is associated with known spatial locations that correspond with each density pixel.

Figure 5:
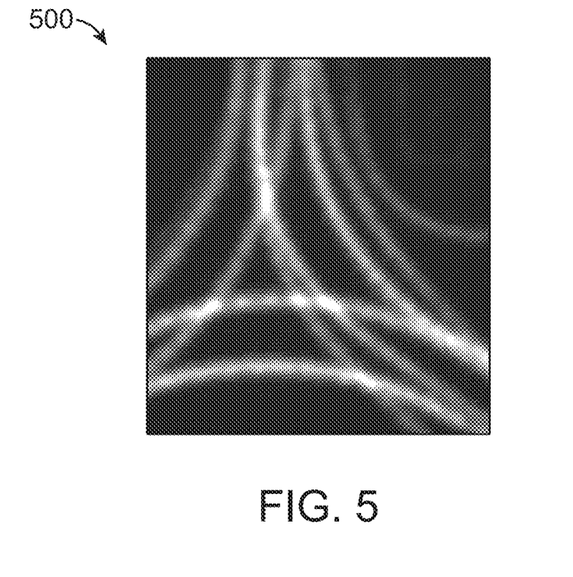
FIG. 5 is an example of a density map, in accordance with some embodiments.

FIG. 5 is an example of a density map 500, in accordance with some embodiments. The density map 500 includes density pixels having values indicating an amount of location data received from a spatial location associated with the density pixel, or "data intensity." For example, the density pixel values can represent a volume or rate of location data received from the devices 104 within a predefined period of time. The density map 500 may be generated by treating each density pixel (or groups of density pixels) as a discrete spatial location, and determining the amount of location data received from each discrete spatial location as the value of each corresponding density pixel. A smoothing filter may then be applied to the density map 500, resulting in an image as shown in FIG. 5 where data intensity of the density pixels are represented by brighter regions.

Returning to FIG. 2, the server 110 matches 220 the density pixels of the density map with the pixels of the image. The geographical region of the image may also include roads, which serve as distinctive features for matching with the road layout represented by the density map. In some embodiments, the server 110 converts the image and the density map into edge maps, and then performs a convolution using the edge maps to determine pixels of the image that match or best match the density pixels of the density map, as discussed in greater detail in process 300 shown in FIG. 3. The edge maps include edge pixels that represent the magnitude of the edge (e.g., the magnitude of the change based on a sobel filter) for every pixel in the image, and thus provides an indication of distinctive features in the image and the density map. The road layout is more distinctive from other portions of the image and density maps after conversion to the edge maps, thus improving the accuracy of the matching. The server 110 performs the convolution to match the edge pixels of the edge maps. If the image captured a larger geographical region than the geographical region defined by the density map, then only a portion of the pixels of the image are matched to the density pixels of the density map.

In some embodiments, various other pre-processing techniques may be used to facilitate the convolution. For example, the pre-processing may include scaling and/or rotating the image or density map. In some embodiment, the pre-processing includes applying a smoothing filter to the density pixels to reduce pixilation (e.g., as may be caused by variance in location data samples) and to increase the distinctiveness of density pixels representing roads for the matching with the pixels of the image.

In some embodiments, the density pixels of the density map are matched with the pixels of the image using a convolutional neural network. The convolutional neural network can include a convolutional layer, a pooling layer, a rectified linear unit (ReLU) layer, etc. Using the convolutional neural network can reduce pre-processing steps such as rotation and scaling. The convolutional neural network receives the edge maps (or in some embodiments, the unprocessed image and density map), and outputs an indication matching pixel location. In some embodiments, the convolutional neural network uses a neural network model generated from training data including inputs (e.g., image and density map, edge maps, etc.) and expected outputs (e.g., expected spatial locations, expected offsets, etc.). In some embodiments, the density pixels of the density map are matched with the pixels of the image using a scale-invariant feature transform (SIFT), or via other corner-detection methods.

The server 110 determines 225 spatial locations of the pixels of the image based on the spatial locations of the matching density pixels of the density map. Because the precise spatial location of each density pixel of the density map is known from the location data, the server 110 is able to determine the locations of the pixels of the image that correspond with the density pixels of the density map.

The server 110 determines 230 spatial locations of other pixels of the image that fail to match the density pixels of the density map based on the spatial locations of the pixels that match the density map. For example, each pixel of the image represents a particular spatial distance as may be determined from the spatial locations of between corresponding density pixels, and this per-pixel distance can be used to calculate the spatial locations of each pixel of the image. In some embodiments, the server 110 determines the spatial location of the image as represented by coordinate value (e.g., of the top left pixel) and a pixel distance value defining the spatial distance represented by each of the pixels. In some embodiments, the server 110 applies an offset to an initial or uncertain spatial location of the image (e.g., as may be caused by satellite tilt, surface topography variation, etc.) using the spatial location of the image determined using the process 200.

In some embodiments, the image is one of a series of images (e.g., taken from the same satellite one after another). The images may be spatially offset with respect to each other, and the spatial offset between the images are known. When the spatial location of an image is determined based on matching with at least one hotspot, the spatial locations of the other images in the series may be determine using the spatial offset of the images with respect to each other and the determined spatial location of the image.

In some embodiments, the hotspot is not a density map generated from location data, but instead is some other type of data that indicates distinctive features and spatial locations of those features. For example, the hotspot may be another image or a map with a road network or some other representation of features and known spatial locations.

Figure 3:
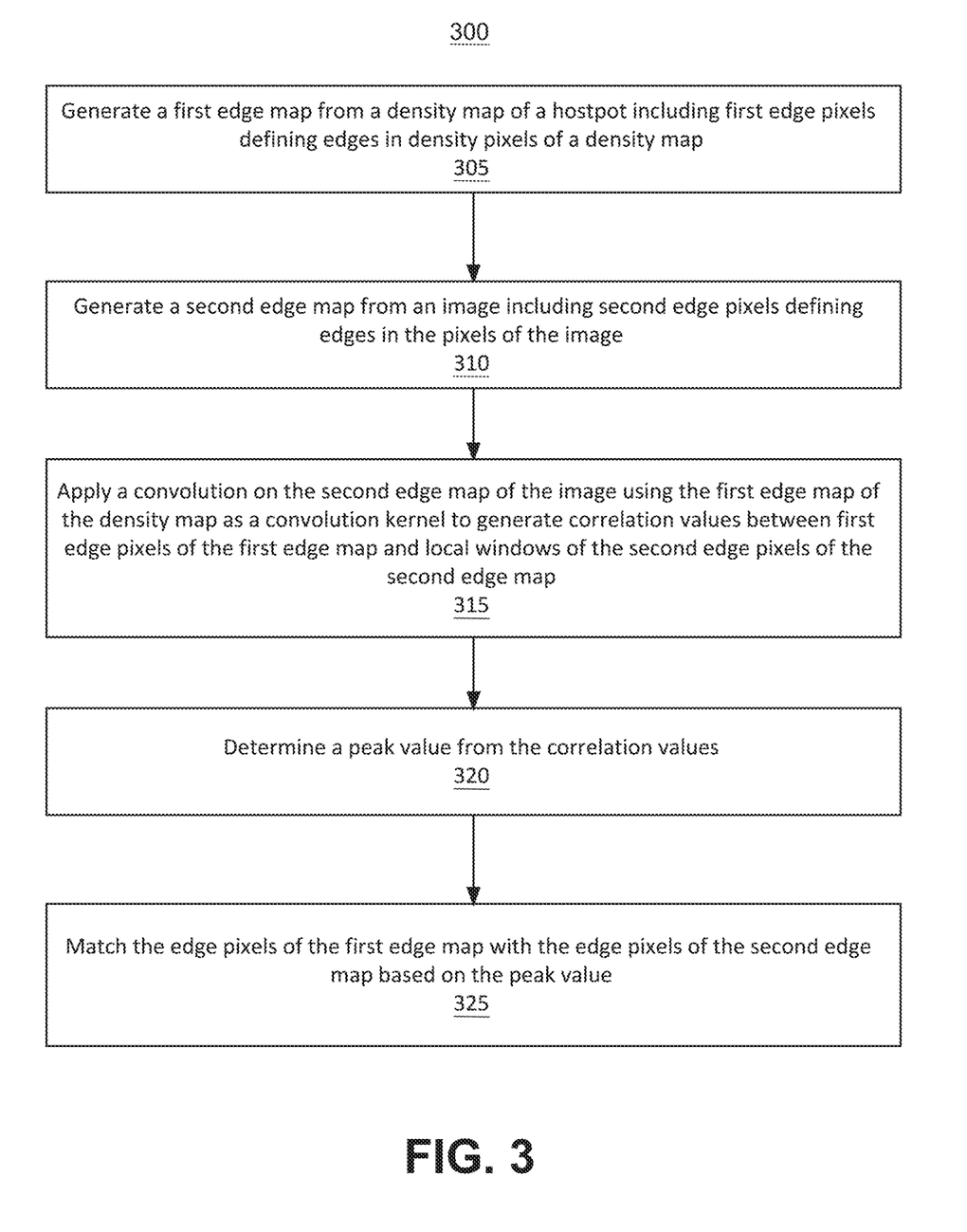
FIG. 3 is a flow chart of a process for matching density pixels of a density map with pixels of an image, in accordance with some embodiments.

FIG. 3 is a flow chart of a process 300 for matching density pixels of a density map with pixels of an image, in accordance with some embodiments. The process 300 can be performed at step 220 of method 200. The steps of the process 300 may be performed in different orders, and the process 300 may include different, additional, or fewer steps.

The server 110 generates 305 a first edge map from a density map of a hotspot including first edge pixels defining edges in the density pixels of the density map. For example, a canny filter or other edge detection algorithm can be applied to the density pixels of the density map to generate the edge map. The edge pixels of the edge map may each include a value that indicates the magnitude of an edge from the density map at the corresponding edge pixel. An edge in the density map can occur, for example, at the edge of roads where many devices 104 are registered traveling on the road, but relatively fewer devices 104 are registered along the side of the road. Thus, the edge map conversion for the density map makes the roads of the density map more distinctive from the other features.

Figure 6:
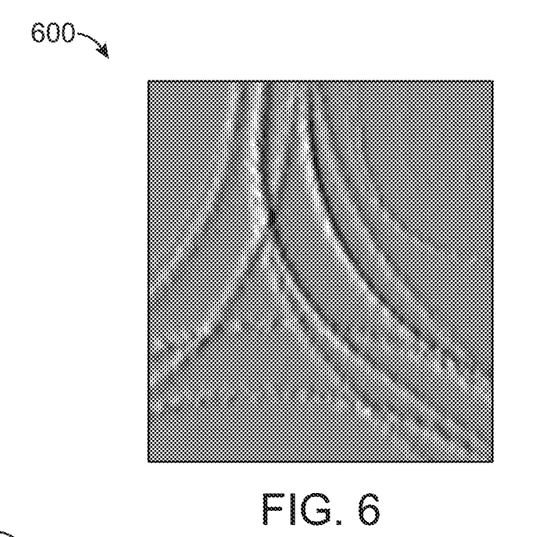
FIG. 6 is an example of an edge map generated from the density map of FIG. 5, in accordance with some embodiments.

FIG. 6 is an example of an edge map 600 generated from the density map 500, in accordance with some embodiments. A canny filter is applied to the density map 500 to generate the edge map 600. The edge map 600 includes edge pixels that correspond with density pixels of the density map 500. The edge pixels each has a value indicating the magnitude of an edge in the density map 500 of the hotspot exists at the corresponding density pixel of the density map 500.

Returning to FIG. 3, the server 110 generates 310 a second edge map from the image including second edge pixels defining edges in the pixels of the image. A canny filter or other edge detection algorithm can also be applied to the pixels of the image to generate the second edge map. The edge pixels of the second edge map each have a value that indicates the magnitude of an edge in the image at the corresponding pixel. An edge in the image can also occur at the edges of roads, resulting in the roads being more distinctive in the second edge map. While other features in the image (e.g., buildings, trees, etc.) can also have edges, these edges are usually weaker and less distinctive than lines formed from road edges in the image, and thus are reduced as noise by the canny filter. Thus, the edge map conversion for the image makes the roads of the image more distinctive from the other features.

Figure 7:
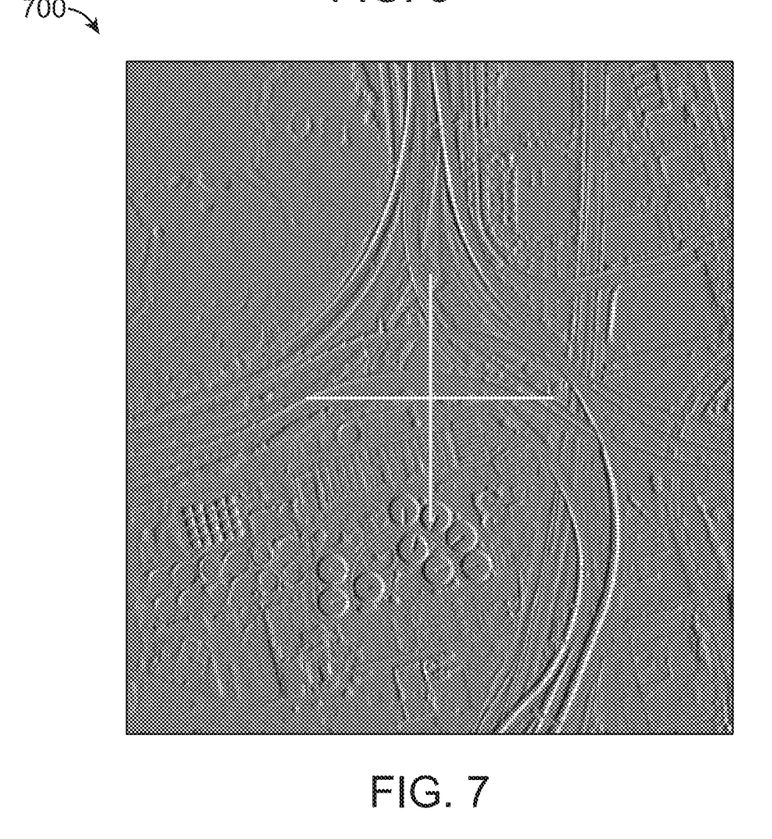
FIG. 7 is an example of an edge map generated from the image of FIG. 4, in accordance with some embodiments.

FIG. 7 is an example of an edge map 700 generated from the image 400, in accordance with some embodiments. A canny filter is applied to the image 400 to generate the edge map 700. The edge map 700 includes edge pixels that each corresponds with a pixel of the image 400. Each edge pixel has a value indicating a magnitude of an edge in the image 400 exists at the corresponding pixel of the image 400.

Returning to FIG. 3, the server 110 applies 315 a convolution on the second edge map of the image using the first edge map of the density map as a convolution kernel to generate correlation values between first edge pixels of the first edge map and local windows of the second edge pixels of the second edge map. The convolution results in the two edge maps being slid against each other (e.g., via a Fourier transform) to define local windows, and a correlation score being calculated for every local window to indicate the amount of match between the first edge map and the local window of the second edge map. A local window refers to a combination of overlapping position between the first and second edge maps. Each local window is defined by a collection of second edge pixels having the same pixel size as the first edge map used as the convolution kernel. The road structure in both the image and the density map become more distinctive after conversion to edge map, thus filtering the image and density maps can improve the accuracy of the correlation values and the quality of programmatic matching between the image and the density map. In some embodiments, the convolution is applied to the pixels of the image and the density pixels of the density map without conversion to edge maps, or after conversion using a different type of filter. In some embodiments, the cross correlation score is determined using a Fast Fourier Transform convolution on the reference image, and on a mirrored (reversed in the X and Y dimensions) target image.

The server 110 determines 320 a peak value from the correlation values. For example, the server 110 compares each of the correlation scores for the local windows, and determines the peak value as the highest correlation score. Thus, the peak value defines a particular local window of the second edge pixels derived from the image that best match the first edge pixels derived from the density map.

The server 110 matches 325 the first edge pixels of the first edge map with the second edge pixels of the second edge map based on the peak value. The correlation values are convolution results that indicate amount of match between the first edge map and the local windows of the second edge map, and thus the peak value defines the local window of the second edge map (e.g., or center edge pixel of the local window) that best matches the second edge map kernel. As discussed above, each of the first edge pixels are associated with a particular density pixel of the density map and each of the second edge pixels are associated with a particular pixel of the image. Thus, by matching edge pixels of the first and second edge maps, some or all of the pixels of the image are matched to the density pixels of the density map.

Figure 8:
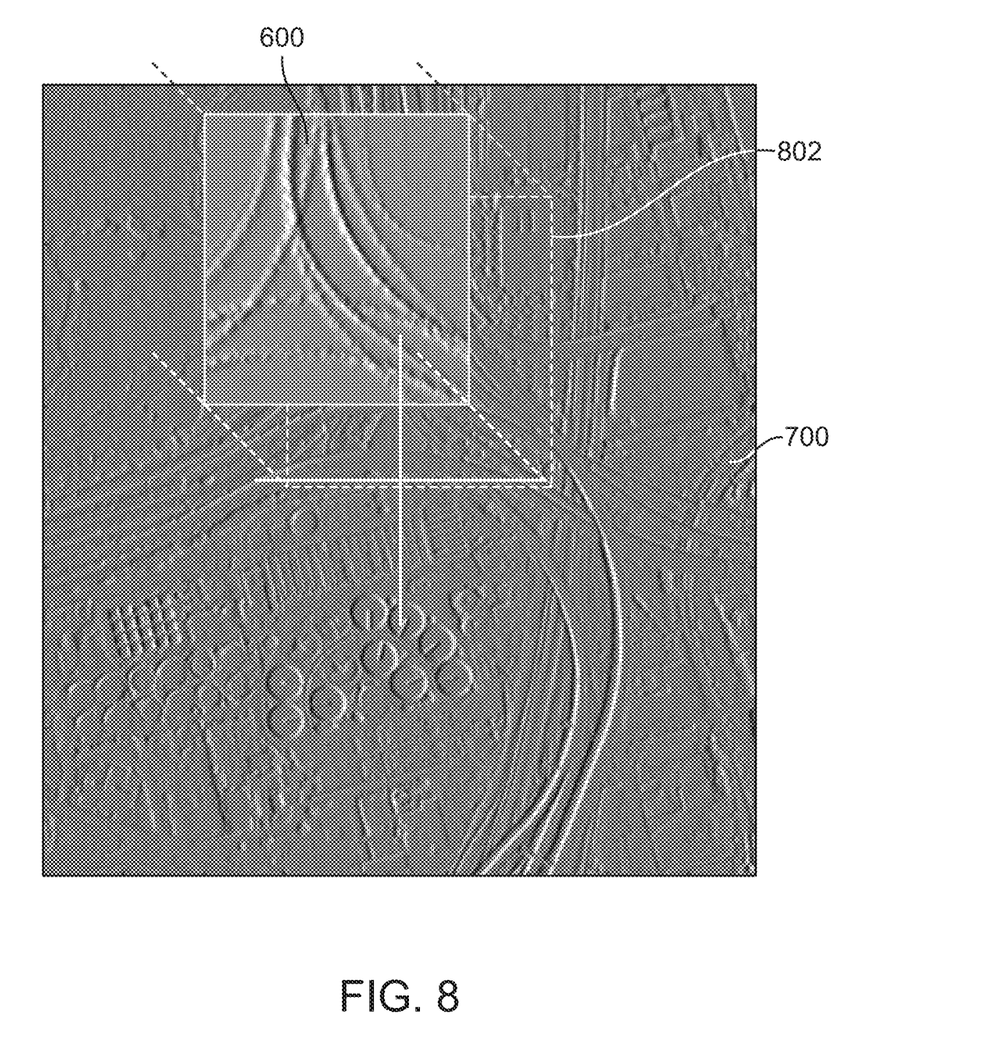
FIG. 8 is an example of a convolution applied to the edge maps shown in FIGS. 6 and 7, in accordance with some embodiments.

FIG. 8 is an example of a convolution applied to the edge maps 600 and 700, in accordance with some embodiments. The edge map 600 is used as a convolution kernel for local windows of the edge map 700. The edge map 600 is shifted across the edge map 700, such as in a raster-like fashion. For each local window of the edge map 700 that overlaps the edge map 600, a correlation score is determined to indicate the amount of match between the edge map 600 and the local window of the edge map 700. A peak value of the correlation scores indicates a match or best match between the edge map 600 and the local window 802. Because the spatial locations of the edge pixels of the edge map 600 are known from the location data and density map, the spatial locations of the edge pixels of the local window 802 can be determined, and thus the spatial locations of the pixels of the image 400 can also be determined.

In some embodiments, the server 110 generates a correlation image to facilitate the matching of the edge pixels of the first and second edge maps. The correlation image includes correlation pixels of the correlation scores. Each correlation pixel of the correlation image corresponds with a pixel of the image, and has a value defined by the correlation score determined using the correlation pixel as the center pixel of the local window for the convolution with the second edge map kernel. The server 110 determines an (X, Y) offset value between the center correlation pixel of the correlation image and the correlation pixel having the highest correlation score, and determines the spatial locations of the pixels of the image based on the offset value and the known spatial locations of the hotspot.

Figure 9:
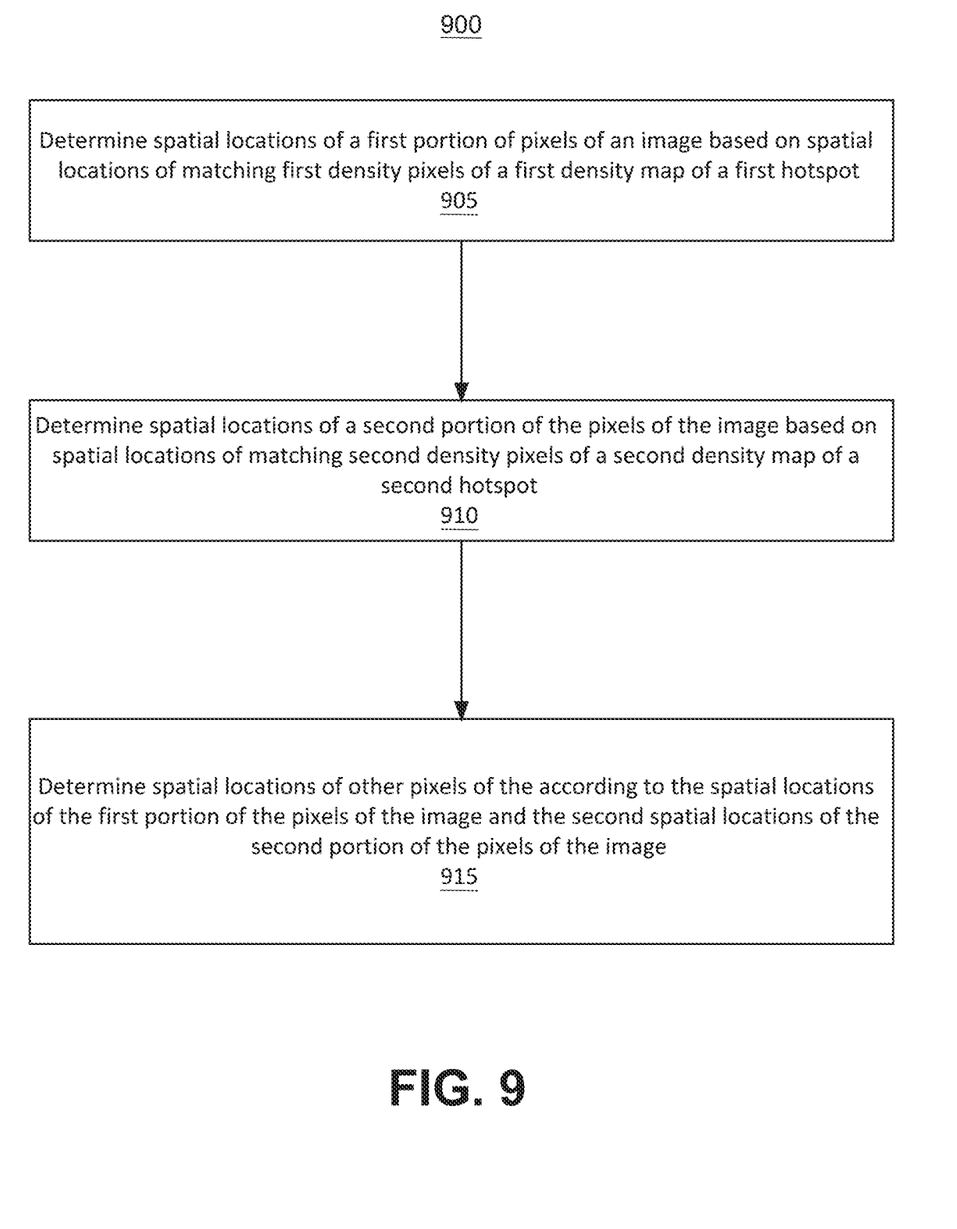
FIG. 9 is a flow chart of a process for determining spatial locations of an image using multiple density maps, in accordance with some embodiments.

In some embodiments, the edge map for a hotspot can be generated from images other than density maps, such as a map of a road network, other satellite images, image chips with known locations, or some other representation of features and known spatial locations FIG. 9 is a flow chart of a process 900 for determining spatial locations of an image using multiple density maps, in accordance with some embodiments. The process 900 provides for programmatic identification of spatial locations of the image based on comparisons with multiple density maps. If multiple density maps indicate a consistent spatial location for the pixels of the image, then the certainty of the spatial location match for the pixels is improved. In another example, if multiple density maps indicate different spatial locations for the pixels (e.g., as may be caused by satellite camera tilt), then the spatial locations of the other pixels can be adjusted accordingly to best fit each pixel of the image to the spatial locations of the pixels matched with hotspots. In some embodiments, the steps of the process 900 are performed by components of the system 100, such as by the server 110 of the mapping system 102 or the mobile device 104. In other embodiments, a different computing device, such as a backend processor of the mapping system 102, performs the process 900. The steps may be performed in different orders, and the process 900 may include different, additional, or fewer steps.

The server 110 determines 905 spatial locations of a first portion of pixels of an image based on spatial locations of matching first density pixels of a first density map of a first hotspot. For example, the process 200 may be used to determine the spatial locations of pixels that match with the density pixels of the first density map.

The server 110 determines 910 spatial locations of a second portion of the pixels of the image based on spatial locations of matching second density pixels of a second density map of a second hotspot. The first and second hotspots represent different geographical regions, and are matched to different pixels of the image. The process 200 may also be used to determine the spatial locations of the pixels that match the second density pixels of the second density map.

The server 110 determines 915 spatial locations of other pixels of the image according to the spatial locations of the first portion of the pixels of the image and the spatial locations of the second portion of the pixels of the image. The other pixels of the image include the pixels that fail to match the density pixels of the first and second density maps. The spatial location of each pixel of the image can be determined from each density map, and the results from each density map can be compared for consistency. Although process 900 is discussed using two density maps for two different hotspots, the spatial locations of pixels of an image can be determined based matching with density maps for one or multiple hotspots.

Figure 10:
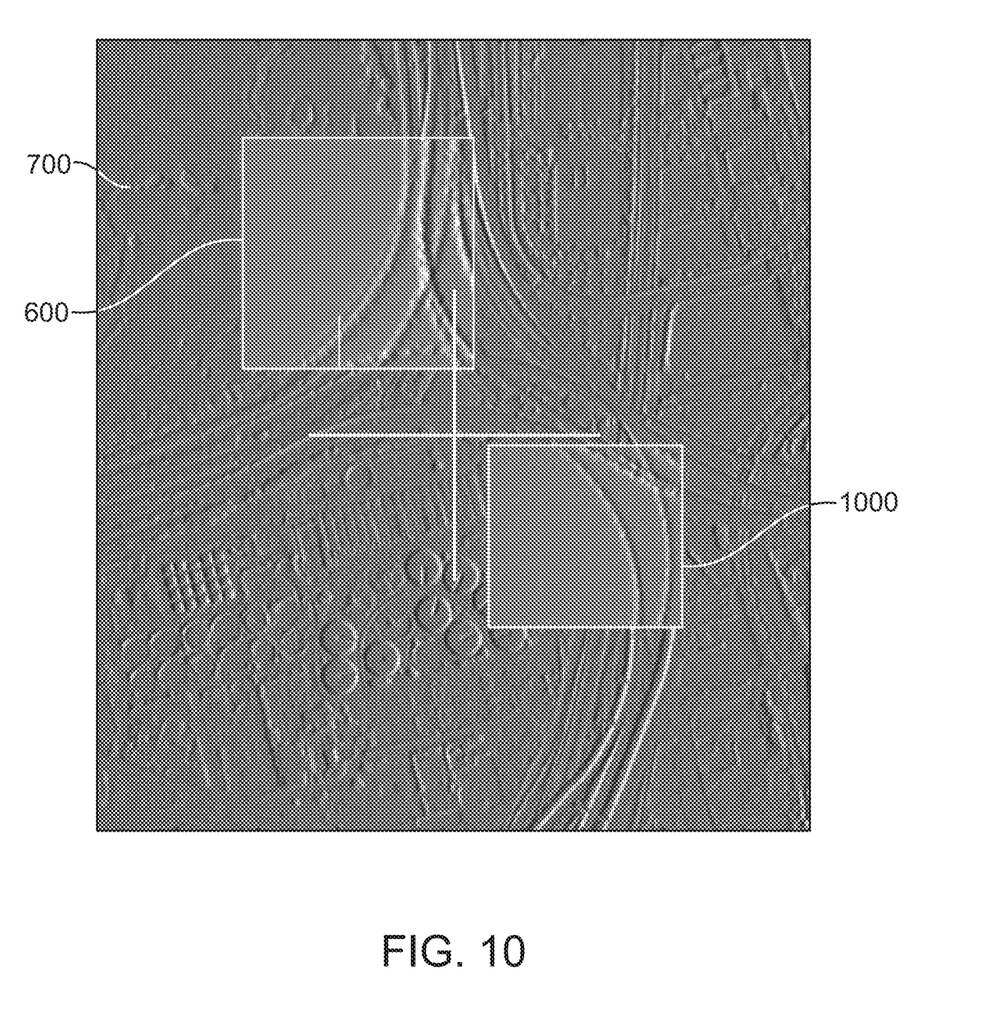
FIG. 10 is an example of matching pixels of an edge map generated from an image with multiple edge maps generated from density maps, in accordance with some embodiments.

FIG. 10 is an example of matching pixels of an edge map 700 generated from the image 400 with multiple edge maps 600 and 1000 generated from density maps, in accordance with some embodiments. An image is converted to the edge map 700, a first density map of a first hotspot is converted to the edge map 600, and a second density map of a second hotspot is converted to the edge map 1000. The edge maps 600 and 1000 are matched to edge pixels of the edge map 700. The spatial locations associated with the edge pixels of the edge maps 600 and 1000 are used to determine the spatial locations of each edge pixel of the edge map 700, and thus the spatial locations of each pixel of the image 400.

In some embodiments, the image is one of a series of images (e.g., taken from the same satellite one after another. The images may be spatially offset with respect to each other, and the spatial offset or relationship between the images are known. A first hotspot can be matched with a spatial location in a first image in the series and a second hotspot can be matched with spatial locations in a second image in the series. When the spatial location of the first and second images are determined based on matching with the first and second hotspots, the spatial locations of the other images in the series may be determine using the spatial offsets of the images with respect to each other. In general, one or more of hotspots can be matched to one or more of images in a series of images having known spatial relationships. The spatial locations of each image in the series that is not matched to a hotspot can be derived from at least one image that matches a hotspot and the spatial offset between the images in the series.

Selecting Optimal Hotspots

Figure 11:
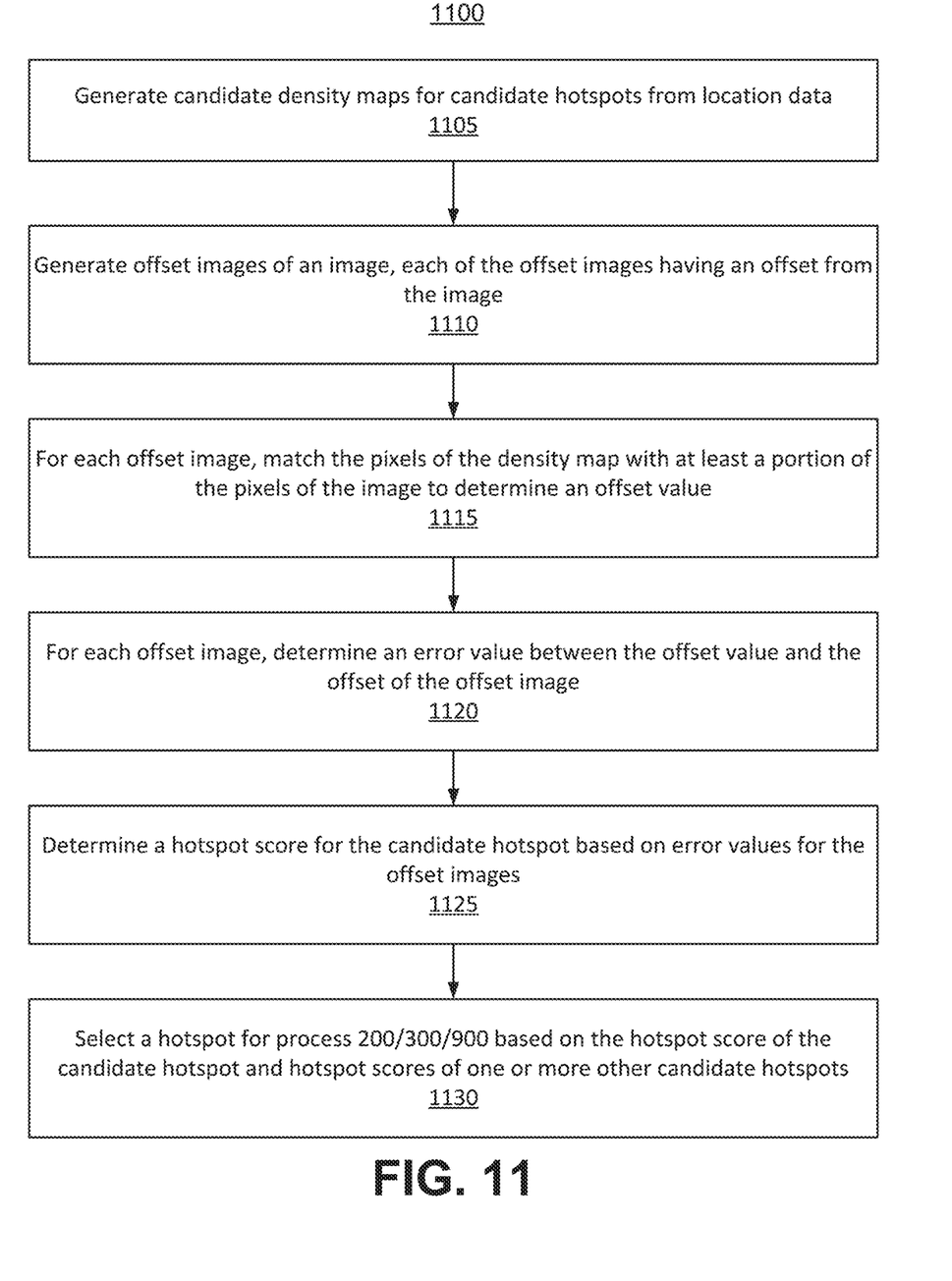
FIG. 11 is a flow chart of a process for selecting a hotspot, in accordance with some embodiments.

FIG. 11 is a flow chart of a process 1100 for selecting a hotspot, in accordance with some embodiments. Some geographic regions may be more suitable as hotspots than others. For example, geographic regions having more distinctive road layouts may be more effective hotspots than geographic regions having rectangular road grid layouts or linear, non-intersecting road(s). Examples of distinctive road layouts may include road layouts including curved roads and intersections including curved roads. The process 1100 provides for programmatically discovering optimal hotspots. In some embodiments, the steps of the process 1100 are performed by components of the system 100, such as by the server 110 of the mapping system 102 or the mobile device 104. In other embodiments, a different computing device, such as a backend processor of the mapping system 102, performs the process 1100. The steps may be performed in different orders, and the process 1100 may include different, additional, or fewer steps.

The server 110 generates 1105 candidate density maps for candidate hotspots from location data. For example, the server 110 receives location data from devices 104 over a predefined period of time (e.g., a day) and within a particular geographic region, and creates a set of candidate density maps. The set of candidate density maps may represent "tiles" of location data representing different spatial locations. In some embodiments, some or all of the density maps are converted to GeoJSON format.

The server 110 generates 1110 offset images of an image, each of the offset images having an offset from the image. The image may correspond to a particular candidate density map. The server 110 may randomly offset the image to generate each of the offset images. For example, each offset image can be offset based on a random normal distribution with a standard deviation of n pixels (e.g., n=10 pixels, in some embodiments), where each pixel is associated with a particular spatial distance. As such, each candidate hotspot is associated with an image, and the image is offset to generate a set of offset images.

For each offset image, the server 110 matches 1115 density pixels of a candidate density map with pixels of the offset image to determine an offset value. For example, the server 110 performs the process 200 using the candidate density map and the offset image to determine the offset value.

For each offset image, the server 110 determines 1120 an error value between the offset value and the offset of the offset image. The offset value may be different from the actual offset of the offset image, and the error value provides an indication of the amount of difference. As such, the server 110 determines an error value for each offset image to generate a set of error values between the candidate density map and the offset images.

The server 110 determines 1125 a hotspot score for the candidate hotspot based on error values for the offset images. The hotspot score for the candidate hotspot indicates the suitability of the candidate hotspot to be selected as a hotspot for the process 200/300. In some embodiments, the hotspot score is determined based on the set of error values of the offset images, such as by determining an average of the error values. In some embodiments, the hotspot score may be further based on the number of error values in the set of error values beneath a predefined threshold (e.g., less than 5 pixels of error).

The server 110 selects 1130 the candidate hotspot for the process 200/300 based on the hotspot score for the candidate hotspot and one or more other hotspot scores for one or more other candidate hotspots. The server 110 determines hotspot scores for each of the candidate hotspots of the geographical region, and selects one or more hotspots for the processes 200/300/900 to identify spatial locations of pixels of images based on the hotspot scores. In some embodiments, the candidate hotspots are ranked according to hotspot scores, and selected based on the ranking. In some embodiments, the hotspot scores are compared to a threshold value, and selected based on satisfaction of the threshold value.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for determining spatial locations of pixels of an image, comprising:
   receiving location data within a period of time from devices located within a hotspot;
   generating a density map for the hotspot including density pixels associated with spatial locations defined by the location data, each density pixel having a value indicating a number of instances of location data received from the devices at an associated spatial location within the period of time;
   matching the density pixels of the density map to at least a portion of the pixels of the image; and
   determining spatial locations of the at least a portion of the pixels of the image based on the spatial locations of the matching density pixels of the density map.

2. The method of claim 1, wherein matching the density pixels of the density map to the at least a portion of the pixels of the image includes:
   generating a first edge map from the density map, the first edge map including first edge pixels defining edges in the density pixels of the density map;
   generating a second edge map from the image, the second edge map including second edge pixels defining edges in the pixels of the image; and
   matching the first edge pixels of the first edge map with at least a portion of the second pixels of the second edge map.

3. The method of claim 2, wherein matching the first edge pixels of the first edge map with the at least a portion of the second edge pixels of the second edge map includes applying a convolution on the second edge map using the first edge map as a convolution kernel.

4. The method of claim 3, wherein applying the convolution on the second edge map using the first edge map as the convolution kernel includes:
   generating correlation values between the first edge pixels of the first edge map and local windows of the second edge pixels of the second edge map; and
   determining a peak value from the correlation values.

5. The method of claim 1, further comprising determining second spatial locations of second pixels of a second image based on the determined spatial locations of the at least a portion of the pixels of the image and a spatial offset between the image and the second image.

6. The method of claim 1, further comprising:
   receiving second location data from devices located within a second hotspot;
   generating a second density map for the second hotspot based on the second location data, the second density map including second density pixels associated with second spatial locations defined by the second location data;
   matching the second density pixels of the second density map to at least a portion of second pixels of a second image; and
   determining spatial locations of the at least a portion of the second pixels of the second image based on the second spatial locations of the matching second density pixels of the second density map.

7. The method of claim 6, wherein:
a series of images includes the image, the second image, and at least a third image;
the series of images have spatial offsets with respect to each other; and
the method further includes determining spatial locations of each image in the series of images based on the spatial locations of the at least a portion of the pixels of the image, the spatial locations of the at least a portion of the second pixels of the second image, and the spatial offsets of the series of images.

8. The method of claim 1, further comprising, prior to matching the density pixels of the density map with the at least a portion of the pixels of the image, applying a smoothing filter to the density map.

9. The method of claim 1, further wherein the image was captured via a satellite, via a plane, or via an unmanned autonomous vehicle (UAV).

10. The method of claim 1, wherein the hotspot is a geographical region including at least one curved road and at least a portion of the location data within the hotspot is received from devices reported to have traveled on the at least one curved road.

11. The method of claim 1, further comprising:
generating candidate density maps for candidate hotspots from second location data received from the devices, each second candidate density map including second density pixels;
generating offset images of a second image, each of the offset images having an offset from the second image;
for each offset image, matching second density pixels of a candidate density map with at least a portion of pixels of the offset image to determine an offset value;
for each offset image, determining an error value between the offset value and the offset of the offset image;
determining a hotspot score for the candidate hotspot based on the error values for the offset images; and
selecting the candidate hotspot as the hotspot based on the hotspot score for the candidate hotspot and one or more other hotspot scores for one or more other candidate hotspots.

12. A system for determining spatial locations of pixels of an image, comprising:
one or more processors configured to:
receive location data within a period of time from devices located within a hotspot;
generate a density map for the hotspot including density pixels associated with spatial locations defined by the location data, each density pixel having a value indicating a number of instances of location data received from the devices at an associated spatial location within the period of time;
match the density pixels of the density map to at least a portion of the pixels of the image; and
determine spatial locations of the at least a portion of the pixels of the image based on the spatial locations of the matching density pixels of the density map.

13. The system of claim 12, wherein the one or more processors configured to match the density pixels of the density map to the at least a portion of the pixels of the image includes the one or more processors being configured to:
generate a first edge map from the density map, the first edge map including first edge pixels defining edges in the density pixels of the density map;
generate a second edge map from the image, the second edge map including second edge pixels defining edges in the pixels of the image; and
match the first edge pixels of the first edge map with at least a portion of the second pixels of the second edge map.

14. The system of claim 13, wherein the one or more processors configured to match the first edge pixels of the first edge map with the at least a portion of the second edge pixels of the second edge map includes the one or more processors being configured to apply a convolution on the second edge map using the first edge map as a convolution kernel.

15. The system of claim 14, wherein the one or more processors configured to apply the convolution on the second edge map using the first edge map as the convolution kernel includes the one or more processors being configured to:
generate correlation values between the first edge pixels of the first edge map and local windows of the second edge pixels of the second edge map; and
determine a peak value from the correlation values.

16. The system of claim 12, wherein the one or more processors configured to determine second spatial locations of second pixels of a second image based on the determined spatial locations of the at least a portion of the pixels of the image and a spatial offset between the image and the second image.

17. The system of claim 12, wherein the one or more processors configured to:
receive second location data from devices located within a second hotspot;
generate a second density map for the second hotspot based on the second location data, the second density map including second density pixels associated with second spatial locations defined by the second location data;
match the second density pixels of the second density map to at least a portion of second pixels of a second image; and
determine spatial locations of the at least a portion of the second pixels of the second image based on the second spatial locations of the matching second density pixels of the second density map.

18. The system of claim 17, wherein:
a series of images includes the image, the second image, and at least a third image;
the series of images having spatial offsets with respect to each other; and
the one or more processors configured to determine spatial locations of each image in the series of images based on the spatial locations of the at least a portion of the pixels of the image, the spatial locations of the at least a portion of the second pixels of the second image, and the spatial offsets of the series of images.

19. The system of claim 12, wherein the one or more processors are further configured to, prior to matching the density pixels of the density map with the at least a portion of the pixels of the image, apply a smoothing filter to the density map.

20. The system of claim 12, wherein the image was captured via a satellite, via a plane, or via an unmanned autonomous vehicle (UAV).

21. The system of claim 12, wherein the one or more processors are further configured to:

generate candidate density maps for candidate hotspots from second location data received from the devices, each second candidate density map including second density pixels;
generate offset images of a second image, each of the offset images having an offset from the second image;
for each offset image, match second density pixels of a candidate density map with at least a portion of pixels of the offset image to determine an offset value;
for each offset image, determine an error value between the offset value and the offset of the offset image;
determine a hotspot score for the candidate hotspot based on the error values for the offset images; and
select the candidate hotspot as the hotspot based on the hotspot score for the candidate hotspot and one or more other hotspot scores for one or more other candidate hotspots.

22. A non-transitory computer readable medium storing instructions that when executed by a processor configures the processor to:
receive location data within a period of time from devices located within a hotspot;
generate a density map for the hotspot including density pixels associated with spatial locations defined by the location data, each density pixel having a value indicating a number of instances of location data received from the devices at an associated spatial location within the period of time;
match the density pixels of the density map to at least a portion of the pixels of the image; and
determine spatial locations of the at least a portion of the pixels of the image based on the spatial locations of the matching density pixels of the density map.

* * * * *